(12) United States Patent
Varma

(10) Patent No.: US 7,706,448 B2
(45) Date of Patent: Apr. 27, 2010

(54) REVERSIBLE DIFFUSION-BASED COMPRESSION

(75) Inventor: Ankur Varma, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1494 days.

(21) Appl. No.: 10/630,955

(22) Filed: Jul. 30, 2003

(65) Prior Publication Data

US 2005/0025245 A1     Feb. 3, 2005

(51) Int. Cl.
*H04B 1/66*     (2006.01)
*H04N 7/12*     (2006.01)

(52) U.S. Cl. .................................. 375/240.23
(58) Field of Classification Search ............ 375/240.23, 375/240.12, 240.13, 240.14, 240.25; H04B 1/66; H04N 7/12

See application file for complete search history.

(56) References Cited

U.S. PATENT DOCUMENTS

| | | | |
|---|---|---|---|
| 5,341,464 A | | 8/1994 | Friedman et al. |
| 5,455,600 A | | 10/1995 | Friedman et al. |
| 5,561,751 A | | 10/1996 | Wong |
| 5,757,976 A | * | 5/1998 | Shu .............................. 382/252 |
| 5,982,435 A | * | 11/1999 | Tong et al. ............. 375/240.16 |
| 6,330,075 B1 | * | 12/2001 | Ishikawa ..................... 358/1.9 |
| 6,600,839 B2 | * | 7/2003 | Mancuso et al. ............ 382/268 |
| 6,782,132 B1 | * | 8/2004 | Fogg ........................... 382/232 |
| 6,851,783 B1 | * | 2/2005 | Gupta et al. ................... 347/15 |
| 6,891,641 B1 | * | 5/2005 | Kouzaki ..................... 358/3.05 |
| 7,031,546 B2 | * | 4/2006 | Maeda et al. ............... 382/260 |
| 7,130,474 B2 | * | 10/2006 | Luo et al. .................... 382/239 |
| 7,181,087 B2 | * | 2/2007 | Kang et al. .................. 382/270 |
| 7,265,736 B2 | * | 9/2007 | Lee et al. ...................... 345/60 |
| 7,301,673 B2 | * | 11/2007 | Kang ........................ 358/3.03 |
| 2005/0157791 A1 | * | 7/2005 | Sun ........................ 375/240.16 |

\* cited by examiner

*Primary Examiner*—Tung Vo
(74) *Attorney, Agent, or Firm*—Lee & Hayes, PLLC

(57) ABSTRACT

Subject matter includes exemplary methods of reversible diffusion-based compression and an exemplary compression engine. In one implementation, a reversible diffusion function is applied to decrease high spatial frequency pixel values in an image or a prediction error image residue and to smooth variances between adjacent pixel values. An exemplary reversible diffusion function can increase data compression without loss of high frequency information yet operate with online encoders and decoders that lack significant processing power. An exemplary method transforms the data to make the data more amenable to compression schemes that utilize entropy transforms as an intermediate processing step, for example, prior to Huffman coding.

18 Claims, 14 Drawing Sheets

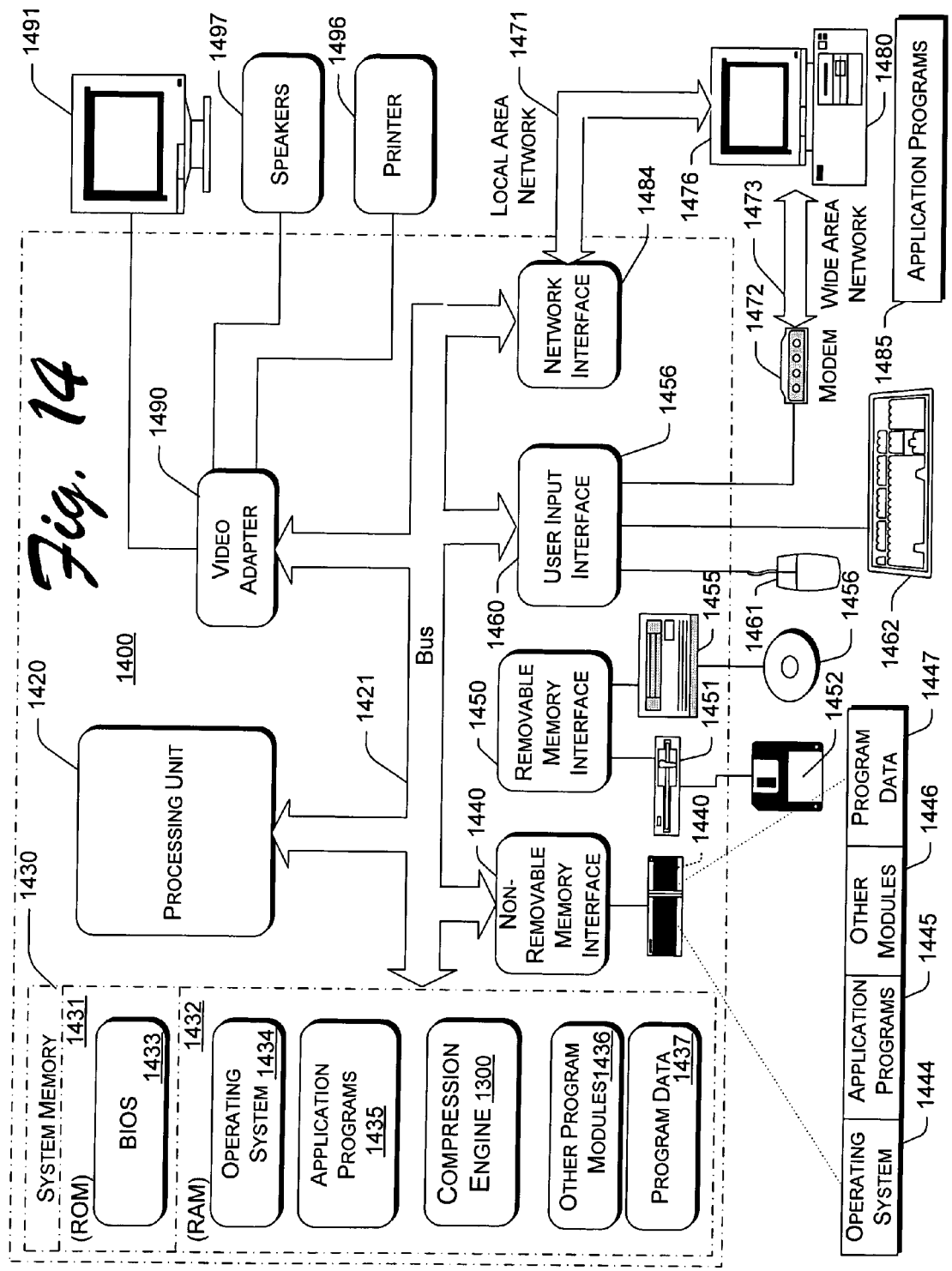

REVERSIBLE DIFFUSION-BASED COMPRESSION

TECHNICAL FIELD

This invention relates generally to multimedia data compression and more specifically to reversible diffusion-based compression.

BACKGROUND

An ideal transmission of an image over a digital network consists of the image being reduced to a minimum amount of information and faithfully reproduced at the receiving end without loss of detail. Although the image data can be compressed for transmission efficiency, the amount of compression is limited by practical concerns and by a theoretical limit. Source coding theory sets the limit for lossless data compression at the entropy rate, "S." It is not possible to compress data—without data loss—using a compression rate that exceeds S. If some distortion can be tolerated, however, then "lossy" data compression using a rate-distortion function can provide a data compression rate that exceeds S, but the decompressed data is not exactly the same as the original data. In the case of an image, the tradeoff between a desirable data compression rate and the introduction of some distortion in the transmitted image may be acceptable as the human brain can compensate for many types of visual artifacts introduced into images by compression techniques.

The Moving Picture Experts Group (MPEG) has adopted various algorithms and standards for single image and video sequence digital data compression. MPEG compression is versatile because it is a composite or toolkit of compression techniques that work together to compress different aspects of an image or a video sequence. For example, an entropy transform known as discrete cosine transformation (DCT) performs transform coding: a spatial compression on each 8×8 pixel matrix composing an image; motion compensation performs a temporal compression on macroblocks consisting of four 8×8 pixel matrices; entropy coding performs statistical compression of coefficients resulting from the DCT; and quantization performs subjective compression of the DCT coefficients.

Consecutive frames of video are often very similar and hence contain approximately the same information, albeit, with slight changes that often result from motion being portrayed in the video sequence. As the number of frames or samples used to portray motion increases per unit time, the amount of change between frames decreases. Motion compensation attempts to find matched or unchanged areas common between frames. These "matches" are encoded via translation vectors. Since their composition is known, matched areas between a first frame and a second frame being predicted from the first frame are allocated a pointer, the translation vector, and removed from further prediction calculations. Once the matches have been removed, the frame (that the encoder is attempting to predict and/or encode) is often left with little or no information. This is called the residual frame. In macroblocks where prediction is being applied, the DCT is performed on the prediction errors instead of on the image itself.

Most video compression techniques rely heavily on motion compensation and residual encoding of the residual frame. Often, the aforementioned matches are not exact and there is "leftover" information in the predicted frame (the one that the encoder is encoding) that still needs to be encoded. A typical residual frame looks "almost blank" with pockets of energy that represents the "errors" in the matches (prediction error). During transform coding, these errors are operated on by the DCT, converting the errors into the frequency domain. The frequency information is then compressed via entropy coding called variable length coding or Huffman encoding. Huffman codes are widely used to convert a string of data to tokens, each having a length that is inversely proportional to the frequency-of-use of the encoded character. For example, to transmit Huffman-encoded English language text, a token for the letter "e" is allotted very few bits, because "e" is the most common character in the alphabet. In MPEG compression, the Huffman type entropy coding usually includes several variable length code tables available to a decoder.

Before Huffman entropy coding, prediction errors are first passed through the DCT transform coding stage in order to reduce the number of non-zero terms. Even though energy pockets (the visual information that did not exactly match during prediction between frames) are found throughout the residual frame, the frequency content is limited and hence by converting the residual frame into the frequency domain, an encoder can reduce the number of non-zero elements, which leads to better packing, i.e., compression.

A complete frame of an image is typically divided into 8×8 "blocks" for transform coding. The DCT converts small blocks of an image (transforming the entire image at once would be to complex) from the spatial domain into the frequency domain, as mentioned. The DCT represents a visual block of image pixels as a matrix of coefficients. For example, the color values used in an image are approximated by coefficients using a sum of cosine functions. Thus, instead of representing visual data spatially as a set of 64 values arrayed in an 8×8 matrix, transform coding using DCT represents the visual data as a varying signal approximated by a set of 64 cosine functions with respective amplitudes. Desirable compression rates result if many of these 64 amplitudes equal zero.

The first horizontal line of DCT coefficient in a matrix describes horizontal spatial frequencies, those in the first vertical column describe vertical spatial frequencies, and the other DCT coefficients in a matrix describe diagonal components. Since different spatial frequencies have a different impact on human perception of an image, it should be noted that the DCT is also important for applying subjective compression as well as purely spatial compression.

DCT coded blocks are excellent starting material for an MPEG quantization compression step because after DCT coefficients are coarsely quantized an inverse DCT of the quantized coefficients does not noticeably degrade the resulting image. Coarse quantization discards image detail information: the compression is accomplished by reducing the numbers of bits used to describe each pixel, rather than reducing the number of pixels as in sub-sampling techniques. Each pixel is reassigned an alternative value and the number of allowed or possible alternative values is less than the number present in the original image. In a grey-scale image, for example, the number of shades of grey that pixels can have is reduced, i.e., fewer greys are used and the greys have wider ranges into which each pixel must be fitted. Quantization where the number of ranges is small is known as coarse quantization.

The DCT, which provides frequency information for the Huffman coding and the quantization, works well (i.e., takes a large image and outputs a relatively small set of numbers that can represent the image in the frequency domain) if the residual image is "smooth." The smoothness of an image is important to data compression. Since human perception notices a large object more than tiny details within the large object, low spatial frequency information is more important to retain during data compression than high spatial frequency information. Several steps of an MPEG set of compression techniques may filter and discard the high spatial frequency information as required by bandwidth limitations.

Cosine functions as used in the DCT are inherently smooth periodic functions, deriving from properties of smoothly changing periodic (circular or oscillatory) motion. Thus, DCT techniques work best with images that have smooth color and brightness changes between and/or across small areas, that is, across adjacent pixels. In other words, images with many sharp edges (a large quantity of sharp, small-scale detail that is not redundant across the image) are more difficult to compress: there is simply more visual information represented in the image, and proportionately more data needed to faithfully represent the image. These small, sharp visual details are difficult to "fit" to an inherently smooth cosine function. Fortunately, in many video sequences, much of the type of detail is extraneous, random noise that is not part of the video sequence and can be removed.

Artifacts can be unwittingly introduced in a video sequence when the camera moves, when the focus changes, etc. and when other "mistakes" occur, such as subtle changes in the lighting of a scene over time. Since these artifacts are subtle, they appear as high variance noise included in the residual frame that is the starting material for the DCT, and result in a great deal of high frequency energy in the DCT output. The high frequency energy is undesirable for attaining favorable data compression.

Even when high spatial frequency detail is not present as noise—the image may just have a lot of detail, movement, and resulting high frequency error—the high spatial frequency detail can often be left out without noticeable degradation. A visual presentation is often improved by removing "molecularly" precise detail—i.e., a too small-scale faithfulness to detail can appear flawed to the eye. Thus, in the quantization compression step or when an image is decompressed a filter may be used to remove some of the detail. To recover the original detail once high spatial frequency information has been discarded in favor of a higher data compression rate, however, is impossible if the data has been discarded, i.e., if an image is smoothed by having detail discarded and then compressed and transmitted, a decoder at the receiving end cannot regenerate the original detail since it has been irreversibly discarded.

SUMMARY

Subject matter includes exemplary methods of reversible diffusion-based compression and an exemplary compression engine. In one implementation, a reversible diffusion function is applied to decrease high spatial frequency pixel values in an image or a prediction error image residue and to smooth variances between adjacent pixel values. An exemplary reversible diffusion function can increase data compression without loss of high frequency information yet operate with online encoders and decoders that lack significant processing power. An exemplary method transforms the data to make the data more amenable to compression schemes that utilize entropy transforms as an intermediate processing step, for example, prior to Huffman coding.

BRIEF DESCRIPTION OF THE DRAWINGS

FIG. 14 is a block diagram of an exemplary computing device suitable for use with the subject matter.

DETAILED DESCRIPTION

Overview

Most video compression techniques rely on motion compensation and residual encoding for the bulk of compression efficacy. The described subject matter includes methods of improving the residual encoding by smoothing an image, more particularly, an image of the prediction error residue ("image" or "residue"). By diffusing prediction error across pixel positions in a frame, the exemplary diffusion smoothing allows transform coding as performed by the DCT to capture or describe more regions of an image residue using only the first three or four frequency terms describing a matrix of each region (the rest of the 11 frequency terms being zero) instead of storing up to 64 pixel values. The described transform coding efficiency is possible with a smoothed image in which random high frequency aberrations (high variance noise) has been smoothed by the exemplary diffusion described herein.

The subject matter uses reversible diffusion, so that high frequency error information that is diffused to enhance compression can be reconstituted when a frame is decompressed, even though most residue features smoothed out are extraneous. Noise and artifacts may yet be needed if the subject frame is an intermediary in a frame prediction process. Reconstitution of the smoothed detail may be desirable for other reasons, and is possible with the exemplary reversible diffusion described herein if other compression steps such as quantization do not discard the information.

Diffusion and Image Smoothness

The various mechanisms of a video compression toolbox work well if a predicted frame has error energy that is smooth, for example, has gradual changes in color and brightness that are amenable to a cosine function and contain some degree of redundancy that compression can abbreviate. The term "smooth" can be characterized by an everyday notion of order. For instance, the sequence of integers "1 1 1 1 1 1 1 1" can be considered smooth, and particularly amenable to cosine-based transformation and subsequent compression. The sequence of integers "1 −1 1 −1 −1 1 −1 1" is not as smooth as the previous sequence, but a smoothing operation such as adding adjacent terms (1+−1), (1+−1), (−1+1), (−1+1), yields "0000," a smooth sequence that contains less terms. In this example, pairs of adjacent terms have diffused into each other.

Figure 1:
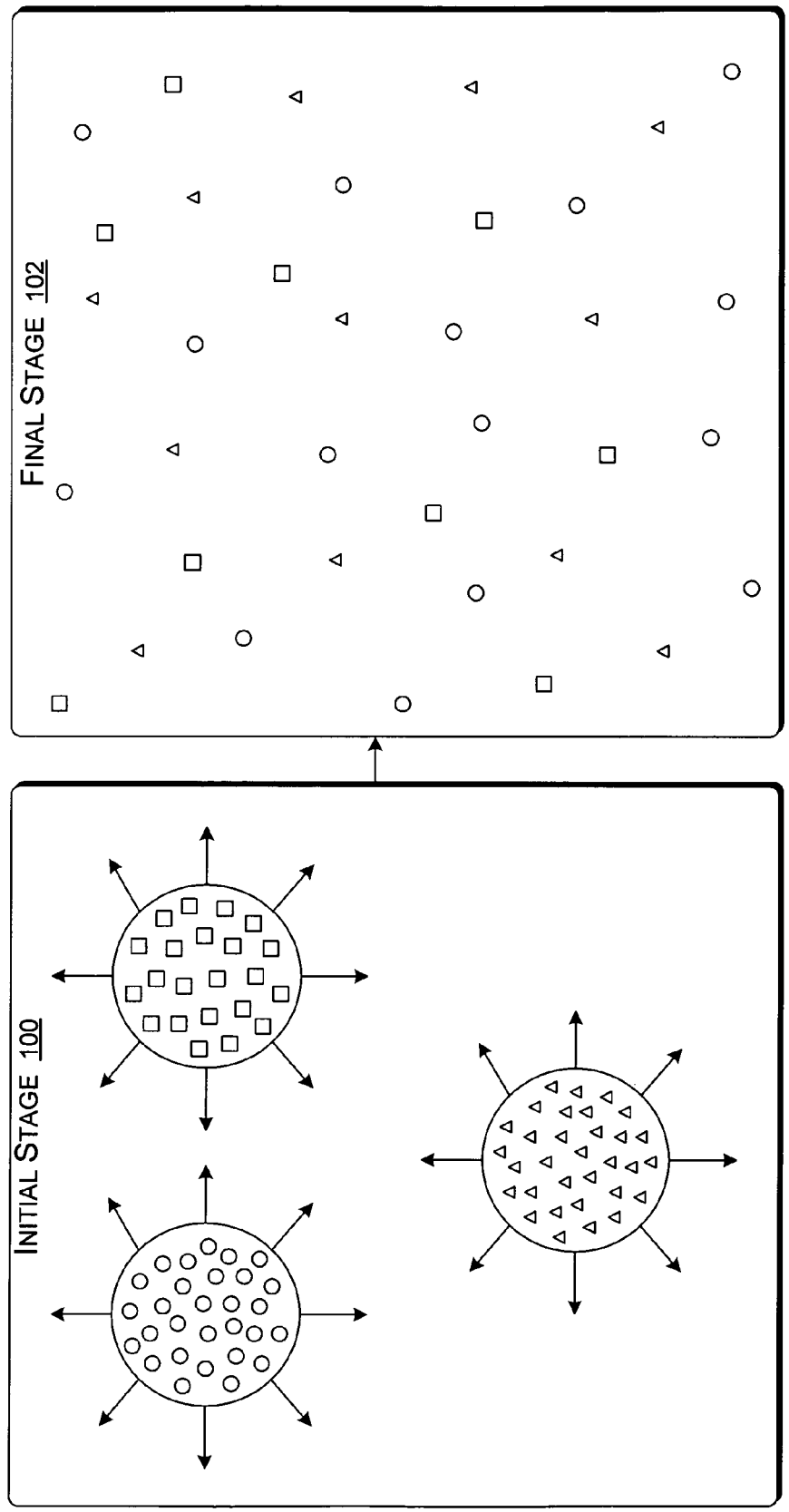
FIG. 1 is a graphic representation of a natural diffusion process.

The mathematics that describe diffusion processes in nature can be employed to increase video data compression. For example, FIG. 1 shows an initial state 100 of a room in which three different perfumes are sprayed in three different areas of the room. Initially, the three areas in which the perfumes were sprayed have individual aromas that are absent from the remainder of the room. The information needed to describe the aroma landscape of the room consists of at least six pieces of data: three area locations and three perfume descriptors. A perfect compression of the data needed to describe the aroma landscape can be no less than the six pieces of information if the three perfumes are different from each other and the three areas of the room are also different from each other.

Over time, due to diffusion, the molecules of the three perfumes diffuse to uniformly fill the volume of the room at a final state 102 so that the room has a uniform aroma (as macroscopically sensed by a human olfactory organ). The molecules of each perfume have diffused to a maximum state of entropy with respect to diffusion given the volume of the room. At the final state 102, the aroma landscape of the room can be described with only one piece of information, a descriptor for the uniform aroma. No data are needed to describe locations because the entire room has the same uniform aroma.

Figure 2:
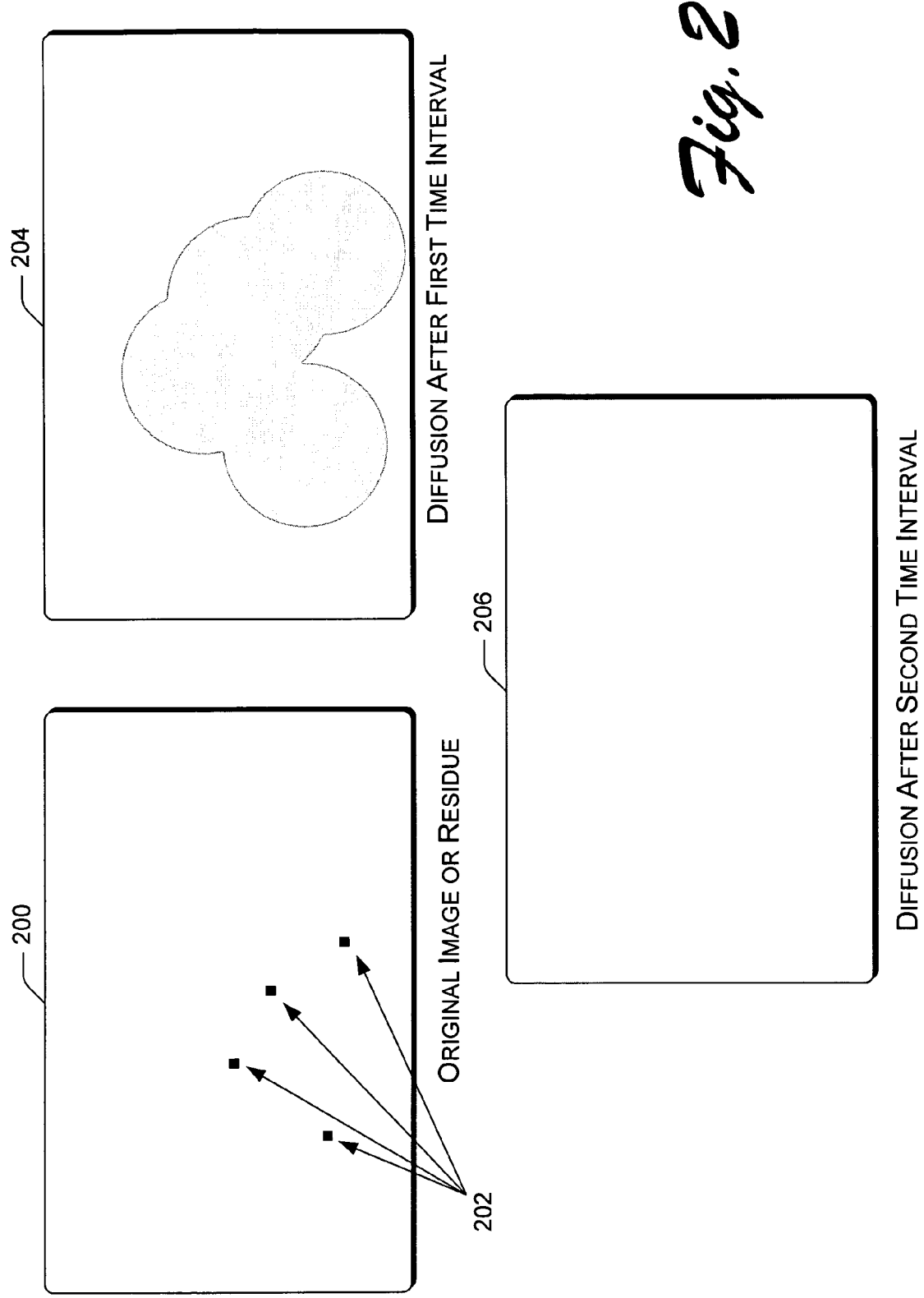
FIG. 2 is a graphic representation of a visual diffusion process.

When the above perfume diffusion example is applied by way of exemplary subject matter in FIG. 2 to a video image 200, or more specifically, to a residue frame containing a landscape of prediction error energy pockets in which high frequency error energy (abrupt visual edges) is undesirable for compression, it is evident that an initial landscape of the video image 200 that includes a higher number of concentrated visual information pockets 202 has more concentrated pockets with more abrupt visual edges (i.e., has information that is more challenging to compress) than the same landscape after a first time interval 204 in which the abrupt visual edges have diffused. The less concentrated visual information pockets have blended by diffusion into each other and have become less concentrated visual information that fills a greater area of the landscape. This new landscape can be described by fewer and more redundant descriptors at more locations across the landscape. After a second diffusion interval 206, the visual information has diffused to an extent where compression is greatly enhanced, in fact, the entire residual image has reached a state of monotony describable by a minimum of descriptors. Put another way, dramatic variances in color and intensity between small parts of the residue frame (e.g., from one pixel to the next) have been reduced into variance values (frequency values) that occur redundantly in the residue frame. Both of these aspects benefit data compression: the removal through smoothing of the high frequency edges in the residue frame, which no longer need a great deal of information to capture their essence and location, and the subsequent increase in common variance values (frequency values) that recur regularly throughout the residue frame-ideal conditions for attaining a high data compression rate.

Thus, if a diffusion process is performed on a residual image, the entropy of concentrated visual information can be increased, which in turn creates a smoother image that can be transformed via transform coding to information that includes increased zero terms (and decreased non-zero terms). A suitable diffusion process, however, needs reversibility so that the original image is recoverable.

EXEMPLARY SYSTEMS AND METHODS

Figure 3:
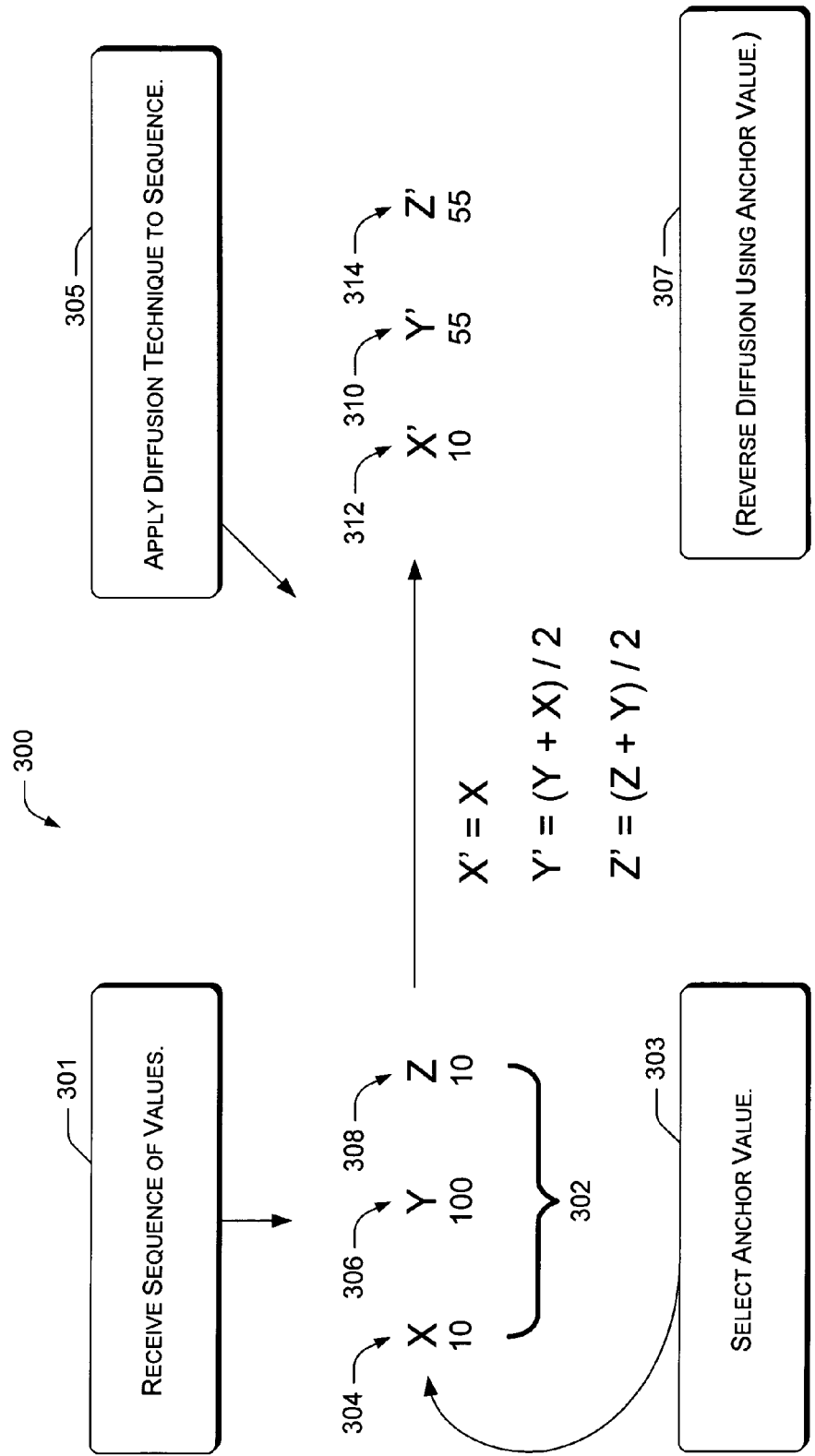
FIG. 3 is a graphic representation of an exemplary method of high variance noise reduction.

FIG. 3 shows one implementation of an exemplary method 300 for noise reduction that can be used for smoothing error prediction energy in a residual frame prior to transform coding. The illustrated implementation of an exemplary method 300 produces compression improvement from between approximately 5% to approximately 30% using one iteration or approximately 5% to approximately 45% using two iterations, while retaining high spatial frequency error information, and while using negligible processing overhead and components. In other words, the exemplary method 300 described below can be used by inexpensive and/or unsophisticated encoders and/or decoders, such as those with simple software decoders for gaming.

At block 301, a sequence of values, such as pixel values, is received. In this implementation, diffusion of high spatial frequency energy occurs reversibly along linear vectors, each vector comprising a sequence of pixel values from a scan line 302 of a residual frame. In this example, a first pixel "X" 304 has a relatively low value of "10" (e.g., for luminance, color, etc.) within a range of possible values from 1 to 100. A second pixel "Y" 306 has a relatively high value of "100." A third pixel "Z" 308 has a relatively low value of "10."

At block 303, one of the values is selected as an anchor value. In this example, the value of X 304, i.e., X=10 can be selected as an anchor value that remains the same for X' 312, i.e., X'=10 after an iteration of the exemplary method 300, as shown in Equation (1):

$$X'=X \qquad \text{Equation (1)}$$

An anchor value allows the diffusion process imparted by one or more iterations of the method 300 to be reversed later. An anchor value provides a diffusion boundary condition for returning to the original undiffused state.

Each pixel value is diffused to one or more adjacent pixels over one or more iterations of the method 300 using an exemplary diffusion function, such as one that averages a given pixel's value with a neighboring pixel's value. As shown in Equation (2), a new value for pixel Y 306 referred to as Y' 310 equals the quantity of the value of Y 306 added to the value of X 304, the quantity then divided by two:

$$Y'=(Y+X)/2 \qquad \text{Equation (2)}$$

At block 305, an exemplary diffusion technique, such as that described in Equations (2) is applied to the sequence of values. Thus, Equation (3), which has the same form as Equation (2), shows how a subsequent values for Z 308 is calculated:

$$Z'=(Z+Y)/2 \qquad \text{Equation (3)}$$

As performed on a same scan line of pixel values, multiple iterations of the method 300 using Equations (1), (2), and (3) reproduce or approximate the changes in concentration with respect to time characteristic of differential equations that describe diffusion processes in nature. In other words, if an uncharacteristically high or low pixel value exists in one region of a scan line (of an image block, and/or of an entire residual frame) then the uncharacteristically high or low value tends through an exemplary diffusion function to even out with adjacent values, and arrive at or approach a characteristic range or value for the entire scan line, image block, and/or residual frame. Thus, Y' equals 55 whereas the original value of Y was 100. Low values are also smoothed: $Z' = 55$ whereas the original value of Z was 10. Because most of the values in a residual frame represent low spatial frequency prediction energy, application of an exemplary method 300 tends to remove the relatively more infrequent high spatial frequency error energy.

It should be noted that a function such as that used in Equations (2) and (3) is only an example of functions that could be used to effect or simulate diffusion when performed once or performed more than once during multiple iterations of an exemplary method 300. Other functions can be used in other implementations of an exemplary method 300, such as modulo, XOR, or differential equation diffusion techniques, or the ones shown in Equations (4), (5), and (6):

$$Y' = (2Y+X)/3 \quad \text{Equation (4)}$$

$$Y' = (Y+X+Z)/3 \quad \text{Equation (5)}$$

$$Y' = (Y/2+X/2)/2 \quad \text{Equation (6)}$$

The diffusion techniques and/or functions described by Equations (2), (3), (4), (5), and (6) when applied to pairs or small sets of adjacent pixel values in a scan pattern allow diffusion smoothing without delving into high complexity calculations requiring significant processing power. For example, although an offline application can sometimes negotiate a high complexity compression technique, the exemplary diffusion techniques included in the subject matter can be used online (real-time) by inexpensive and unsophisticated devices and applications, e.g., having only software encoders or decoders. These benefit from higher image quality using less transmitted data—a circumstance afforded by the improved compression possible with the described exemplary diffusion techniques and exemplary methods.

A function of the type shown in Equation (4) assigns more weight to a subject pixel value than to adjacent pixel values and creates slower diffusion over multiple iterations of an exemplary method 300.

A function of the type shown in Equation (5) spreads the diffusion over more neighboring pixel values during a single iteration of an exemplary method 300, thereby accelerating diffusion.

A function of the type shown in Equation (6) decreases the magnitude of pixel values by a factor during each iteration of an exemplary method 300. This may accelerate smoothing and removal of high spatial frequency values.

At block 307, the diffusion is (optionally) reversed using the selected anchor value. To reverse the diffusion effected by the illustrated implementation of an exemplary method 300 and retrieve the original pixel values of an original residue frame, Equations (1), (2), and (3) can be algebraically rearranged where necessary to yield original values, as shown in Equations (7) and (8):

$$Y = 2Y' - X \quad \text{Equation (7)}$$

$$Z = 2Z' - Y \quad \text{Equation (8)}$$

Since $X=10$ was selected as the unchanging anchor value for the particular iteration, Equation (7) can be readily solved to yield the value of $Y=100$ and Equation (8) in turn can be solved using the value of $Y=100$ to find the value of Z, etc. The reverse diffusion process can continue for the length in pixel values of the scan line vector.

Other diffusion effecting and/or simulating functions that operate during one or more iterations of an exemplary method 300 could also be used with or in place of those represented by the above equations. Known diffusion-dithering filters and algorithms used just for the final display of an image or for quantization could be employed, such as the Floyd-Steinberg, the Burkes, the Stucki, the Jarvis, the Judice, and the Ninke etc., but these possess drawbacks. These known diffusion-dither techniques are either irreversible, or involve complex processor-intensive calculations. The Floyd-Steinberg filter, for example, adds 7/16 of a pixel's calculated error to the pixel to the right of the pixel being mapped, 5/16 to the pixel below, 3/16 to the pixel below and left, and 1/16 to the pixel below and right. Like other known diffusion-dither algorithms, the Floyd-Steinberg requires that an encoder have enough memory and processing power to keep track of many pixel values at once and perform requisite calculations.

Figure 4:
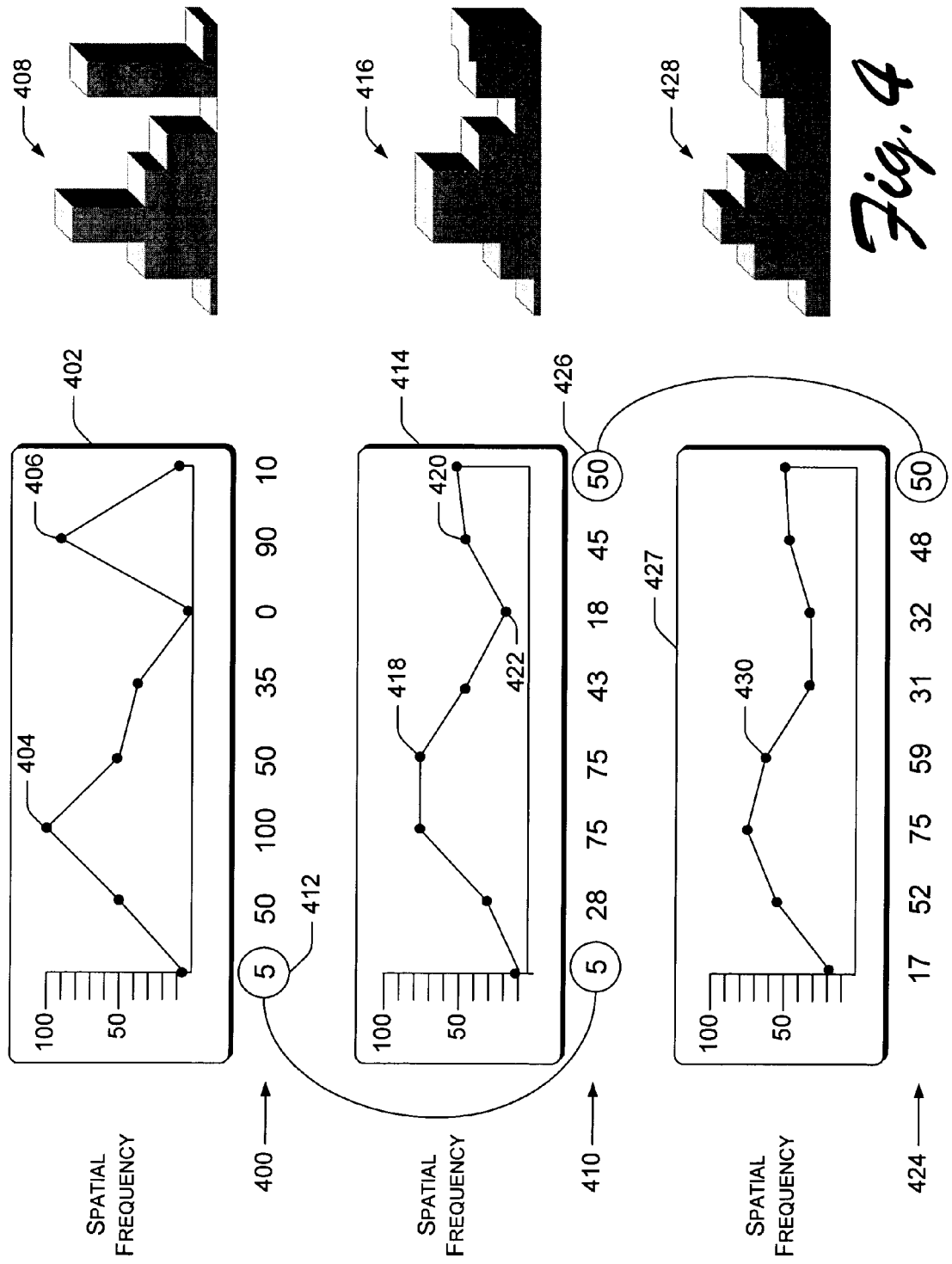
FIG. 4 is a graphic representation of an exemplary noise reduction method applied to a vector of pixel values.

FIG. 4 shows a scan line vector 400 of pixel values on which an exemplary noise reduction and/or smoothing method 300 is to be applied. The scan line vector 400 includes some relatively high frequency horizontal energy, e.g., a change in pixel values from "5" at the leftmost pixel to "100" within an interval of two pixels, and a change from "0" to "90" between two of the adjacent pixels. A spatial frequency graph 402 illustrates the relative spatial frequency landscape, including the sharp high frequency peaks 404 and 406. A bar chart 408 also shows the relative smoothness of the spatial frequency landscape. As described above, it is desirable for increasing compression efficiency to drive the values of high spatial frequency peaks (e.g., 404, 406) down to lower spatial frequency values before the values are transformed into the frequency domain by the DCT.

A second scan line vector 410 represents the original scan line vector 400 after a first iteration of an exemplary method 300 using a diffusion function such as that of Equations (1), (2), and (3) above. Accordingly, the leftmost pixel value 412 in the original scan line vector 400 is selected as an anchor value, as indicated by Equation (1) above, so that the diffusion imparted by the exemplary smoothing method 300 can be reversed during decompression. Each subsequent pixel value to the right of the anchor pixel value 412 in the original scan line vector 400 is added to the unsmoothed pixel value to its left and the sum is divided by two to average pairs of adjacent pixels as indicated above by Equations (2) and (3) thereby providing the new pixel values for the second scan line vector 410. A second spatial frequency graph 414 and a second bar chart 416 illustrate the relative spatial frequency landscape after the first iteration of the exemplary method 300. Peak 404 in the first graph 402 has been smoothed considerably into peak 418 in the second graph 414. Peak 406 in the first graph 402 has also been smoothed considerably into an incline 420 that is now difficult to recognize as a peak. The level of a valley formed by a low spatial frequency value 422 has been raised enhancing the smoothing effect.

A third scan line vector 424 possessing increased spatial frequency 11 smoothness over the previous scan line vector 410 is achieved by a second iteration of the exemplary method 300 using exemplary diffusion functions, such as those in Equations (2) and (3). For this second iteration, the last pixel value processed in the previous (first) iteration is selected to be the unchanging anchor value 426 for the second iteration. Alternatively, the first pixel value of the first and second scan lines, i.e., pixel value 412 could be used as the anchor value for the second iteration as well. However, since the last pixel 426 was the most recently processed, it may be more efficient in some implementations to use the last pixel value 426 of the previous iteration. Thus, a second iteration of the exemplary method 300 using the diffusion functions of Equations (2) and (3) is applied in a reverse scan of the previously smoothed pixel values to obtain the third scan line vector 424. A third graph 427 and third bar chart 428 show a more smoothly curved plot of the spatial frequency landscape than portrayed in the previous second graph 414. A smooth hump 430 now exists instead of the peaks 404, 418 of the first and second graphs 402, 414. The spatial frequency values illustrated in the third graph 427 are particularly amenable to data compression, such as with the DCT transform, for numerous reasons. For example, the high spatial frequency values, undesirable for compression, are absent after having been reversibly smoothed by the reversible diffusion process. Also, the pixel values comprising the smooth curve in the third graph 426 are very similar in the magnitude of their values to pixel values that would be produced in all the regions of a residual frame when the exemplary method 300 is used for the entire frame. The exemplary method 300 produces a greater number of redundant pixel values, enhancing compression.

Figure 5:
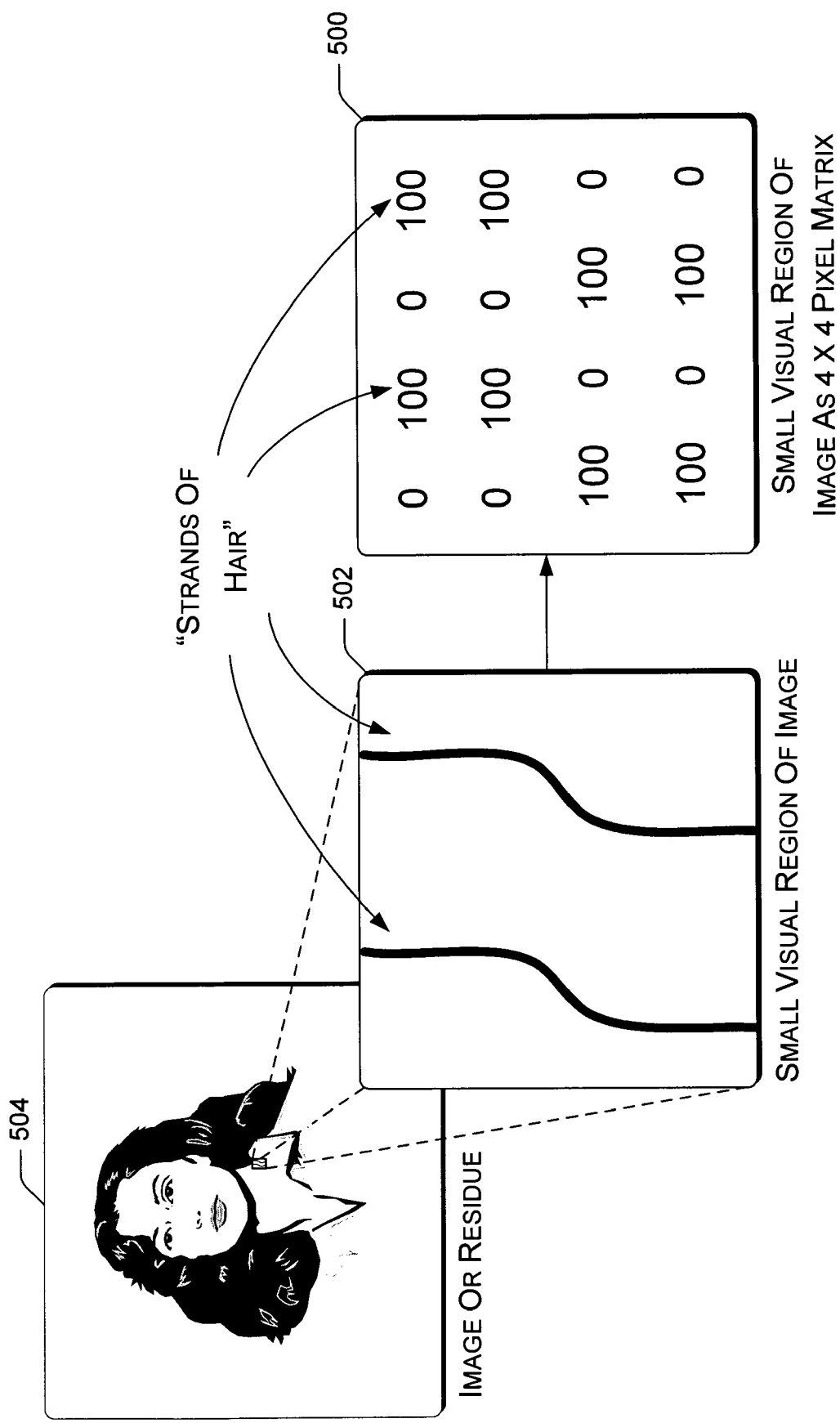
FIG. 5 is a graphic representation of a pixel value matrix suitable as a point for an exemplary noise reduction method.

FIG. 5 shows one implementation of an exemplary method 300 applied to a 4×4 matrix of pixel values 500. In this instance, the 4×4 matrix of pixel values 500 represents a small visual region 502 of an image 504, such as an image portrayed in a video frame or in a residual frame associated with frame prediction. If the image 504 is the latter, then the image is a residue of prediction errors spread across the frame in a landscape of prediction error spatial frequency energy values. In one implementation, a 4×4 matrix provides a suitable amount of pixels for achieving notable compression gains while keeping processing overhead minimal. Of course other matrix sizes may be used with the subject matter, but a 4×4 matrix can provide desirable compression gains even in simple, inexpensive, and unsophisticated encoders and software decoders.

The small visual region 502 contains an image of two strands of hair, which result in sharp visual edges against a uniform background. When rendered as spatial frequency values or as relative color values, etc., the strands of hair are represented as numbers that have a sharp contrast to adjacent numbers representing non-hair parts of the image. Smoothing the sharp contrast between pixel values representing sharp visual edges using an exemplary method 300 is shown in the next figure.

Figure 6:
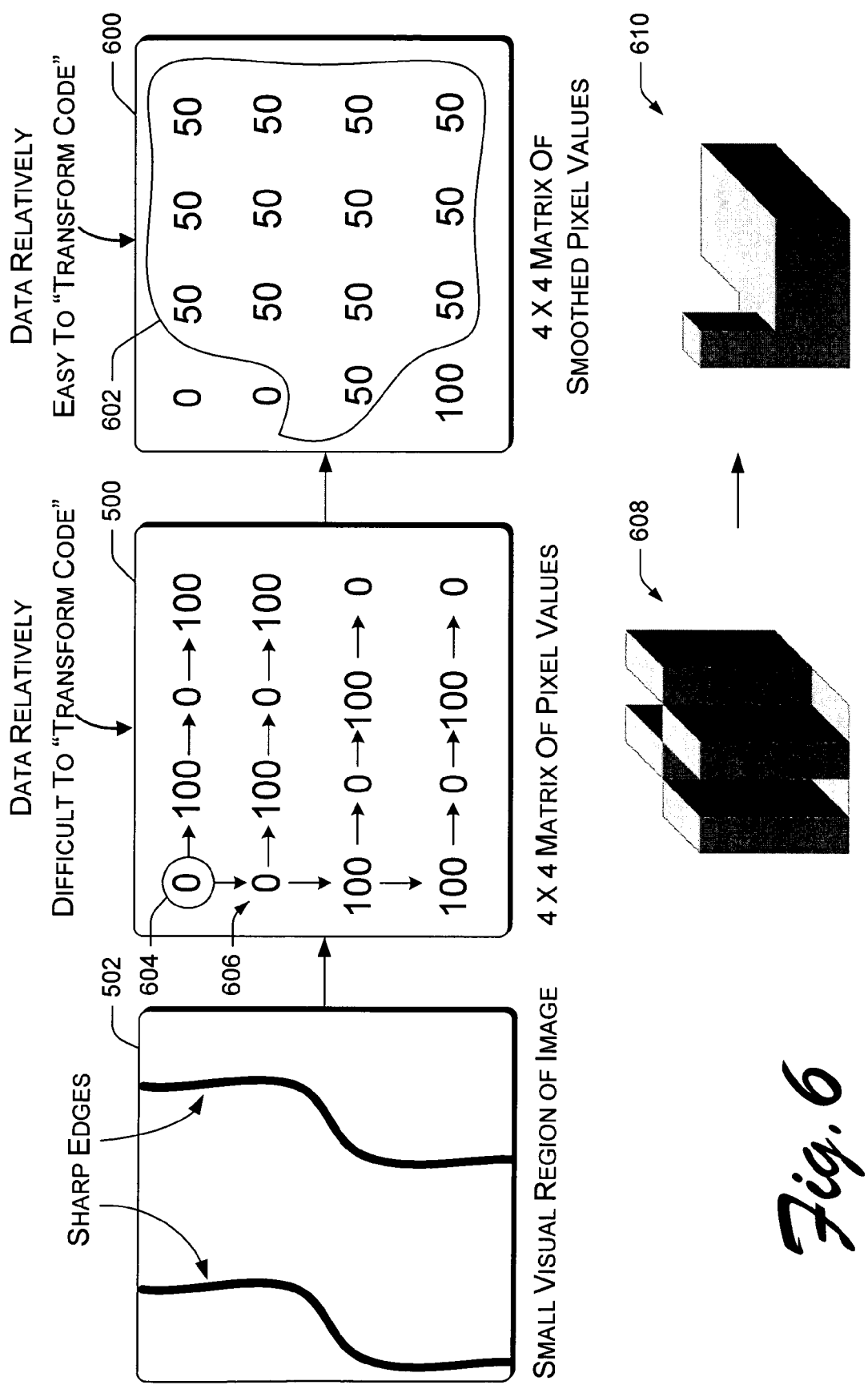
FIG. 6 is a graphic representation of a matrix of smoothed pixel values.

FIG. 6 shows the small visual region 502 of the image 504 of FIG. 5 represented by the 4×4 matrix of pixel values 500. In one implementation, a diffusion function of the form shown in Equation (2) is applied to each horizontal scan line within the 4×4 matrix of pixel values 500, in a scan pattern as shown by arrows, to produce the smoothed pixel values illustrated in the resulting 4×4 matrix of smoothed pixel values 600. Of course additional iterations may apply the same diffusion function to the pixel values repeatedly to obtain further smoothing, but in the illustrated example a single iteration produces uniform values 602 for over 80% of the pixel values. In many cases, two iterations are enough to reap a data compression improvement of 5% to 45% depending on the smoothness of the original image, the quality of the encoding, the number of sharp visual edges, etc.

In the illustrated implementation, the top left pixel value 604 is selected as an unchanging anchor value for performing the smoothing operation so that later the anchor value can be used to reverse the diffusion, if desired. The exemplary diffusion function imparted by Equation (2) is applied in one implementation in a left-to-right horizontal scan. At the end of each horizontal scan line, the scan starts over at the leftmost pixel of the next lower scan line, applying the exemplary diffusion function between the left-most pixel value (e.g., 604) of the subject scan line and the left-most pixel value 606 of the next lower scan line. The scan then continues from left to right on this next lower scan line.

A first bar graph 608 illustrates the relatively high number of high spatial frequency pixel values and sharp visual contrasts associated with the unsmoothed 4×4 matrix of pixel values 500 versus a second bar graph 610 showing a moderated number of high spatial frequency pixel values and smoothed visual contrasts associated with the smoothed 4×4 matrix of pixel values 600.

Figure 7:
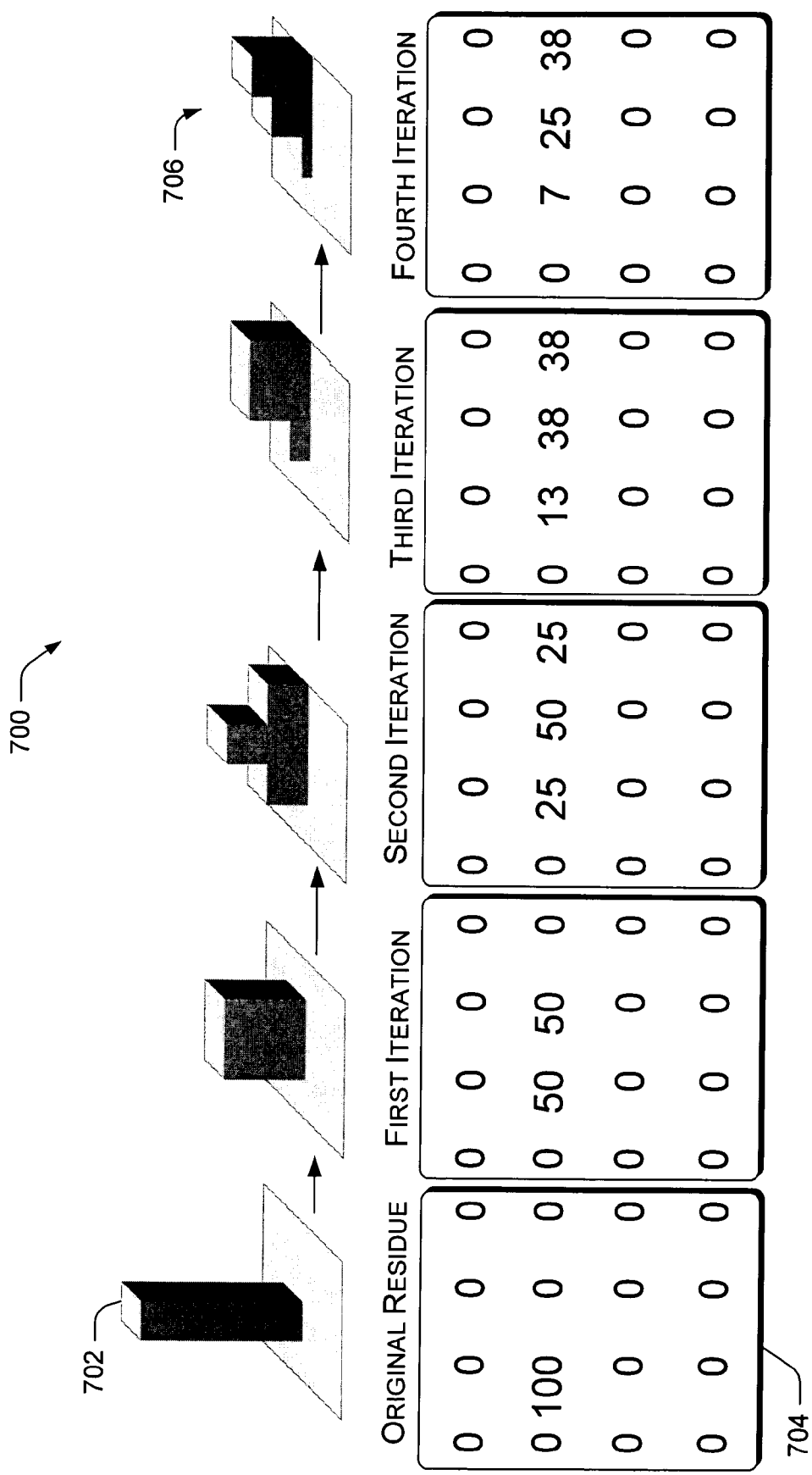
FIG. 7 is a graphic representation of diffusion effects of an exemplary diffusion function.

FIG. 7 shows an exemplary pixel value diffusion process 700 along a selected diffusion direction vector. The diffusion direction result from applying an exemplary diffusion function in a left-to-right scan, wherein a subject pixel value is interacted with a pixel value to its adjacent left. The exemplary diffusion of a high spatial frequency single pixel value 702 is shown over four iterations of an exemplary smoothing method 300 using an exemplary diffusion function, such as that described by Equation (2). In this example, the exemplary 4×4 matrix of pixel values 704 is scanned from left to right, and each subject pixel value is averaged with a pixel value to its left, except at the end of each scan line. This causes the diffusion to move from left to right over multiple iterations, as shown in the illustrated succeeding iterations. A bar chart 706 of the pixel values after the fourth iteration shows that the original single pixel value 702 has been diffused to form an approximation of a gradual curve (desirable for efficient transformation by the DCT) displaced to the right of the original single pixel value 702. The direction of the displacement, or in other words the diffusion vector, is selectable. An exemplary matrix of pixel values can be scanned in any direction. In one implementation, the subject matter reverses the directional vector of the diffusion with each iteration of the method 300. This provides an "alternating current" smoothing process in which the "center of mass" of a spatial frequency value remains in place over multiple iterations, but the spatial frequency landscape becomes smoother.

Figure 8:
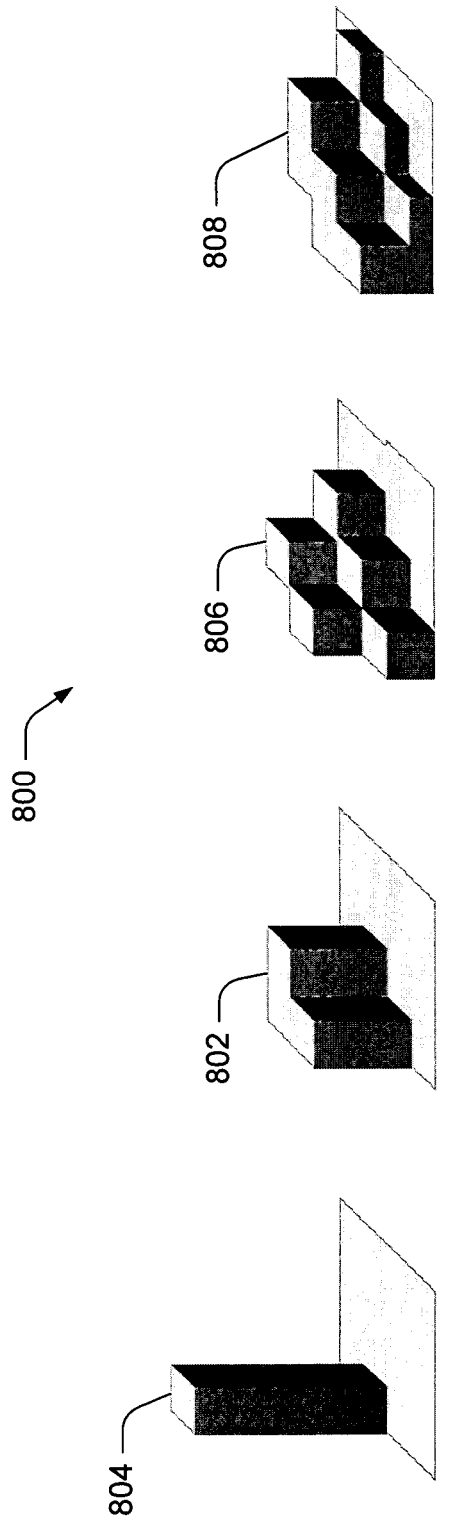
FIG. 8 is a graphic representation of diffusion effects of an exemplary diffusion function applied in an exemplary scan pattern.

FIG. 8 shows another exemplary pixel value diffusion process 800 similar to that shown in FIG. 7, with a second diffusion direction vector added. In fact, an anchor value can be diffused in an arbitrary pattern reflecting a priori information about the underlying pixel matrix. In the illustrated implementation, the second diffusion direction results from applying an exemplary diffusion function from top to bottom for those pixel values at the left-most side of a matrix, wherein a left-most pixel value is interacted with a pixel value immediately below itself. According to one aspect of the subject matter, FIG. 8 demonstrates that one iteration of an exemplary method 300 may be enough to remove the highest spatial frequency pixel values, e.g., a second bar chart 802 representing a first iteration of an exemplary method 300 has three values of "50" resulting from a diffusion smoothing of a single value of "100" in a first bar chart 804 representing an original residue. A second iteration represented by third bar chart 806 further diffuses the spatial frequency values. In some implementations, a third iteration (bar chart 808) may not be needed as further diffusion may not significantly enhance compression when balanced with processing overhead for performing an iteration.

Figure 9:
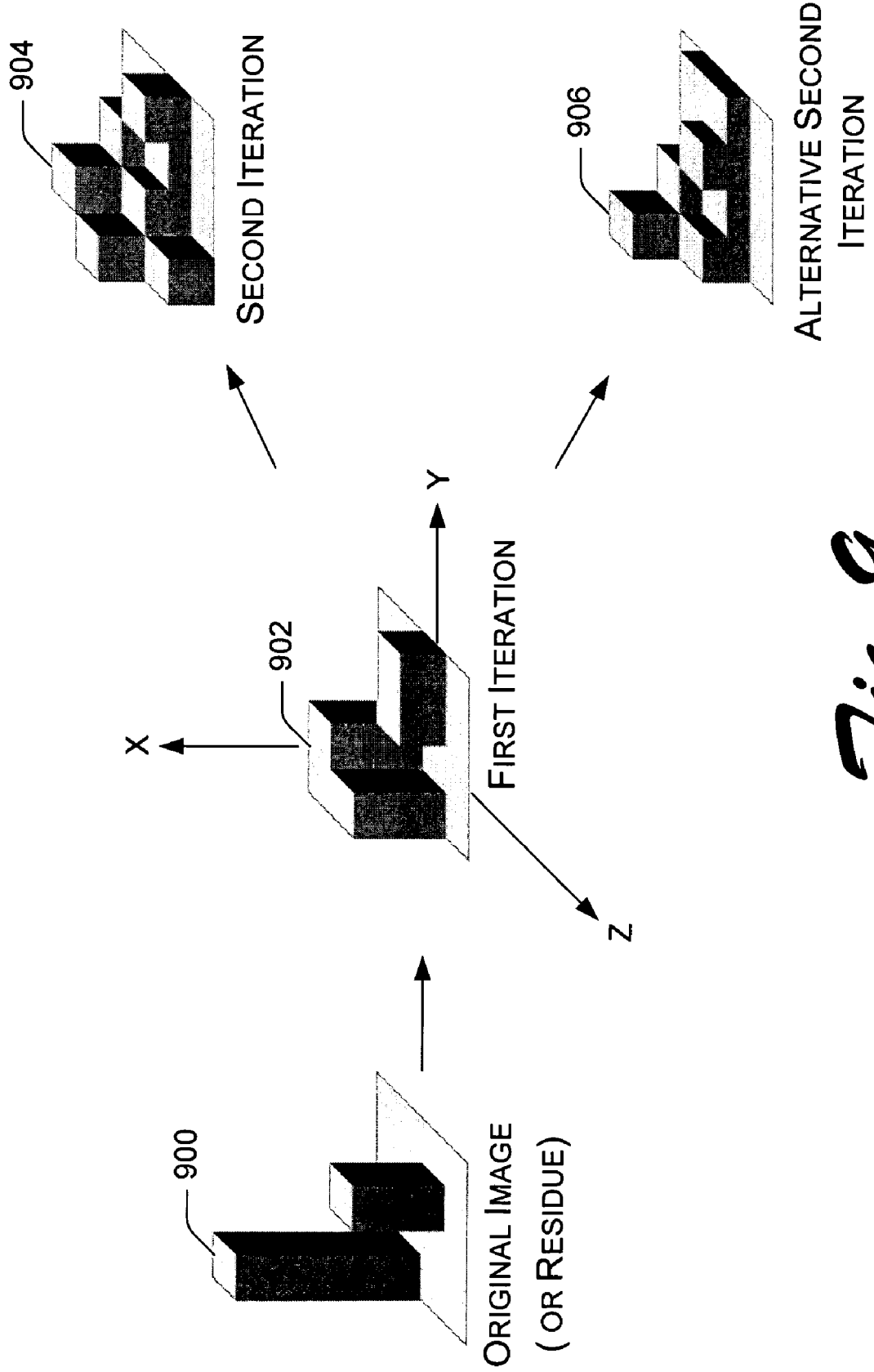
FIG. 9 is a graphic representation of alternative diffusion effects from using different scan directions for a second iteration of an exemplary method.

In one implementation, a different anchor value can be selected for each iteration of an exemplary method 300 (as described above with respect to FIG. 4). FIG. 9 shows a comparison of smoothing results using two different second iterations of the exemplary method 300, wherein one type of second iteration uses the same anchor value and scan pattern as the previous first iteration while an alternative second iteration uses a different anchor value and a scan pattern reversed in direction from that used in the first iteration.

A first bar chart 900 of pixel values represents an original image or residue. After one iteration of an exemplary method 300, a second bar chart 902 shows that the non-zero pixel values have diffused and smoothed to the right along the y axis and for the pixel value in the left-most matrix column, also along the z axis according to an exemplary scan pattern for applying exemplary diffusion functions described above with respect to FIG. 6. A third bar chart 904 shows a second iteration of the exemplary method 300, using the same scan pattern as used for the first iteration. A fourth bar chart 906 shows an alternative second iteration, wherein the scan pattern is reversed scanning from right to left and bottom to top using the same matrix of pixel values from the first iteration, beginning at the bottom right pixel value, which is used as the unchanging anchor value for the alternative second iteration. The alternative result shown in the fourth bar chart 906, may have characteristics such as smoothness, decreased high spatial frequency values, etc., desirable for certain types of images or video applications. In other words, a scan pattern can be selected to give optimal results for certain applications. For example, certain simple decoders may use one type of exemplary anchor value selection method or another, or one type of exemplary scan pattern simply because they have low bandwidth and it is easier to begin a second iteration at the pixel value where the first iteration left off. Alternatively, an exemplary method 300 may use only one iteration. Still further, an exemplary method 300 may use a diagonal scan pattern.

Figure 10:
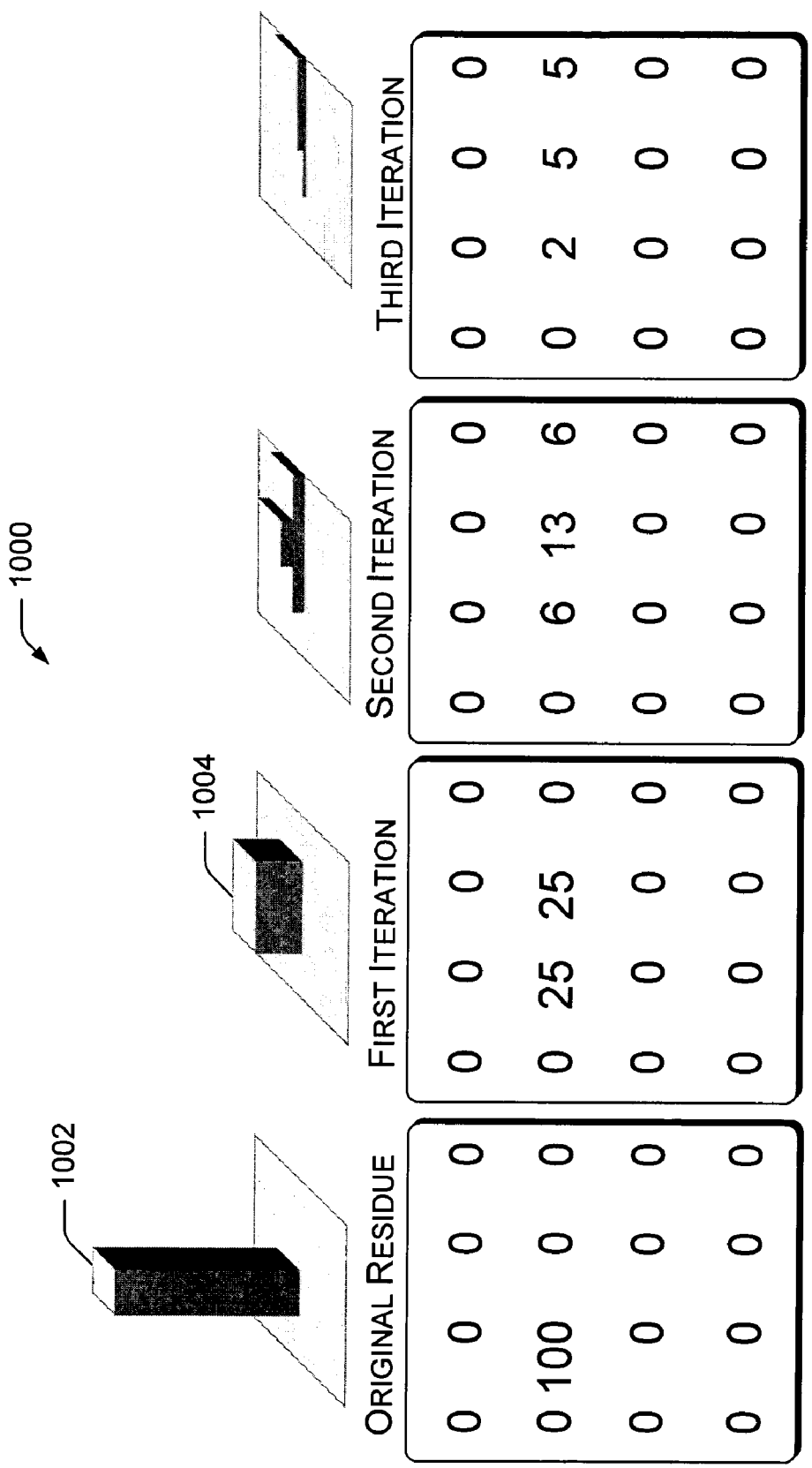
FIG. 10 is a graphic representation of diffusion effects of an exemplary diffusion function applied to reduce magnitudes of high spatial frequency pixel values.

FIG. 10 shows an exemplary diffusion process 1000 wherein the exemplary diffusion function described above in Equation (6) is applied to a high spatial frequency pixel value. Some of the illustrated pixel values are rounded to the nearest higher integer value as needed for clearer presentation. By using a division factor in an exemplary diffusion function, such as that of Equation 6, the magnitude of iterated pixel values can be reduced quickly to a desired lower range. For example, as shown in a first bar chart 1002 a single "maximum" spatial frequency value of "100" can be quickly reduced as shown in a second bar chart 1004 to two spatial frequency values of "25" after only one iteration.

Figure 11:
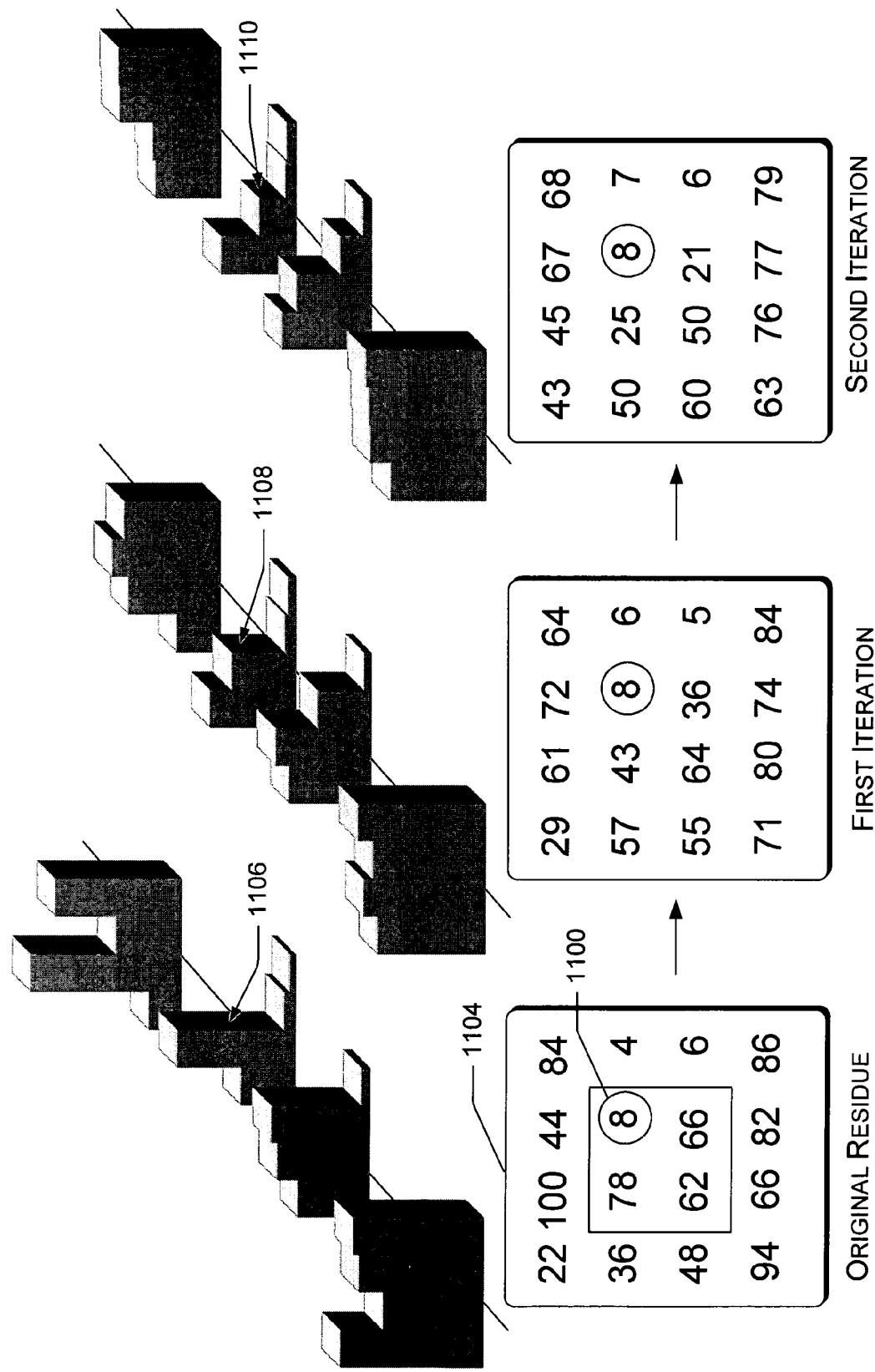
FIG. 11 is a graphic representation of an exemplary method of selecting an anchor value for reversible diffusion.

FIG. 11 shows one implementation of an exemplary method 300 for selecting an anchor value based on its characteristics rather than on its position in a matrix of pixel values.

In one implementation of the subject matter, an anchor value 1100 is selected from a center group 1102 of pixel values in a matrix 1104. This type of anchor value selection allows the selected anchor value 1100 to be diffused in two or more scan directions, thereby spreading the characteristic for which the anchor value 1100 was selected more quickly to surrounding pixel values. Since the anchor value 1100 is typically left unchanged in an exemplary method 300, a selection criterion might be the pixel value with the highest entropy, perhaps as determined by its absolute value or its closeness to a known average value for the particular subject residue.

In the illustrated example, the anchor value 1100 has a value of "8" and is selected because is has the lowest magnitude of the four pixel values in the center group 1102. Using a diffusion function that averages an anchor value 1100 with adjacent pixel values to the left and to the right of itself, the diffusion of the anchor value 1100 to the pixel value on the its left ("43") causes a large variance 1106 to be reduced to a smaller variance 1108 in the first iteration of the exemplary method 300 and to an even smaller variance 1110 in the second iteration. The effect of the anchor value selection is not as dramatic with respect to the pixel value on its right, since that pixel value ("4") is close to the anchor value 1100 selected. It should be noted that by the second iteration of the exemplary method 300, the horizontal scan line vectors illustrated in FIG. 11 have assumed a regular and smoothly stepped appearance devoid of mixtures of large and small variances, that is, the changes between pixel value magnitudes have become more regular, predictable, and uniform after two iterations.

Figure 12:
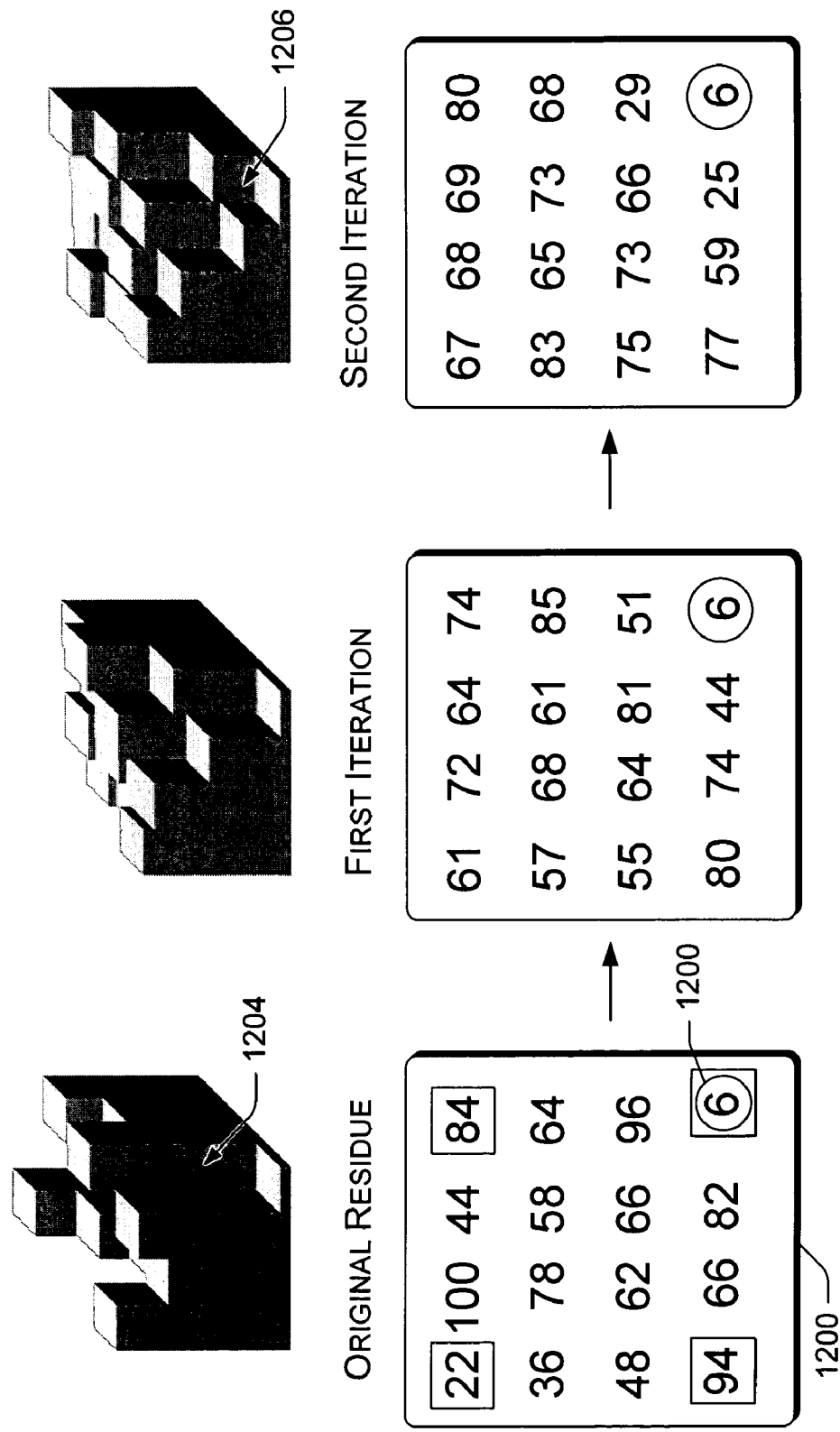
FIG. 12 is a graphic representation of another exemplary method of selecting an anchor value for reversible diffusion.

FIG. 12 shows yet another exemplary implementation of selecting an anchor value 1200 used for assuring reversibility of an applied diffusion function.

In this implementation, the four corner pixel values of a matrix 1202 are examined in order to avoid selecting an (unchanging) anchor value that has a high spatial frequency. This prevents a high noise variance from being unwittingly preserved from the outset of an exemplary method 300 and assists the diffusion function in driving pixel values to low spatial frequency magnitudes. Large variances 1204 in the original residue become smoothly stepped variances 1206 by the second iteration if the selected anchor value 1200 differs greatly in magnitude from its adjacent neighbor pixel values. The scan pattern adopted in this implementation depends on which corner of the matrix 1202 has the selected anchor value 1200. Of course, any pixel value in any size matrix could be selected as an anchor value 1200, the illustrated implementations are only examples of matrices, anchor values, diffusion functions, and scan patterns for exemplary methods.

Exemplary Reversible Diffusion-based Compression Engine

Figure 13:
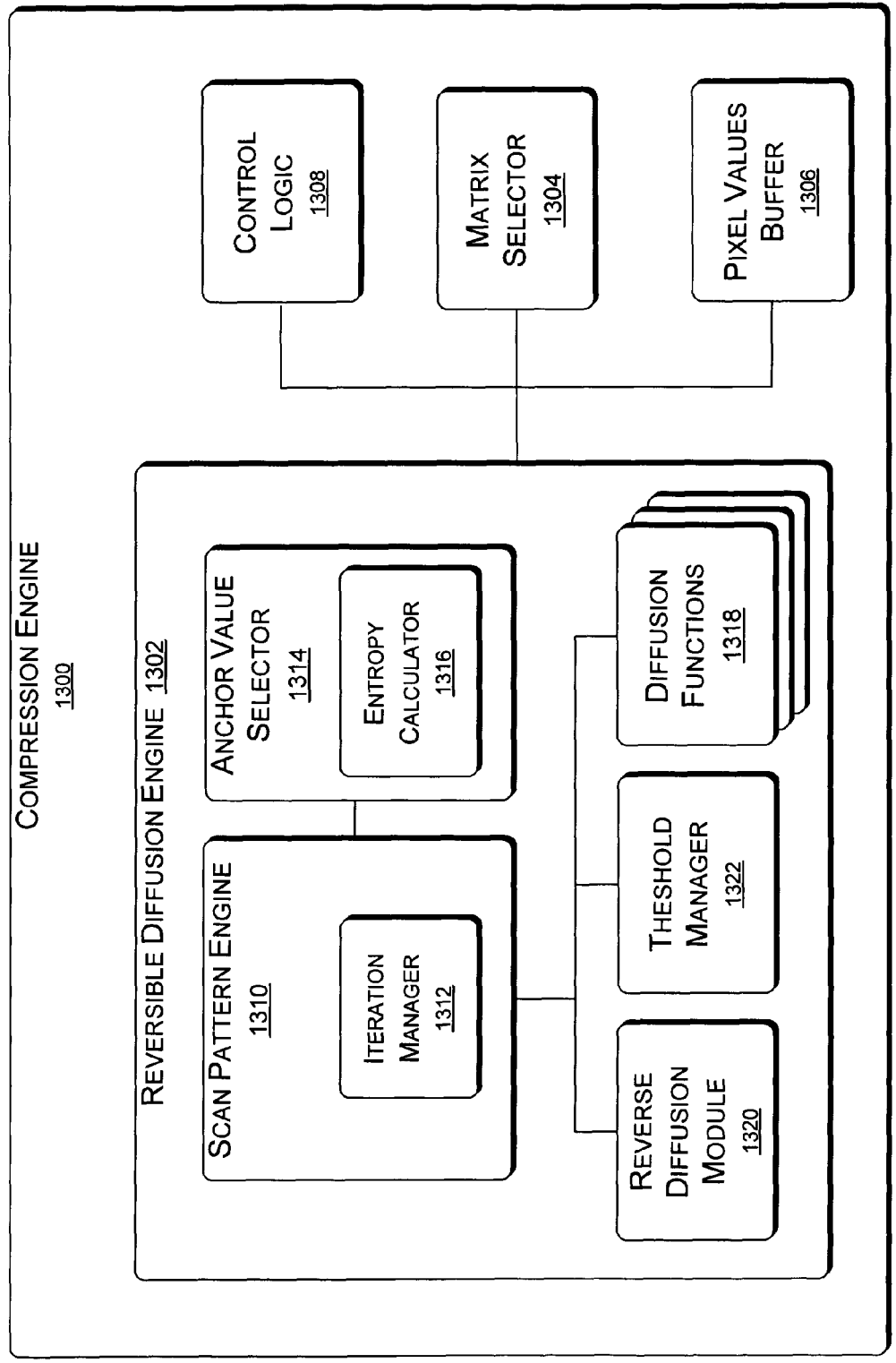
FIG. 13 is a block diagram of an exemplary noise reduction engine.

FIG. 13 shows an exemplary compression engine 1300. A reversible diffusion engine 1302 included in the exemplary compression engine 1300 is communicatively coupled with a matrix selector 1304, a pixel values buffer 1306, and control logic 1308 as illustrated. An exemplary reversible diffusion engine 1302 may further include a scan pattern engine 1310 that includes an iteration manager 1312. In one implementation, a scan pattern engine 1310 is communicatively coupled with an anchor value selector 1314 that may include an entropy calculator 1316. The reversible diffusion engine 1302 may also include a store of diffusion functions 1318 accessible by the scan pattern engine 1310 and may further include a reverse diffusion module 1320.

In one implementation, pixel values representing at least part of residue frame are received by the exemplary compression engine 1300, for example, by the pixel values buffer 1306. The matrix selector 1304 allows the size of a pixel grid matrix to be varied by a user, by the processing characteristics of a device that includes the exemplary compression engine 1300, and/or to suit a particular diffusion function.

A diffusion function from the store of diffusion functions 1318 may be selected by the control logic 1308 or alternatively one or more diffusion functions may be built-in to the diffusion engine. Depending on the diffusion function 1318 selected or built-in, the anchor value selector 1314 selects a pixel value from a subject matrix of pixel values to be an anchor value. The anchor value may be selected on the basis of low or high entropy, as determined by the entropy calculator 1316, relative to all the pixel values in the subject matrix as a whole, or relative to adjacent or neighboring pixel values in the subject matrix, and/or relative to a preset or predetermined entropy value. Alternatively, an anchor value may be selected randomly, or may be adopted from a pixel value that occurs at the same position in each subject matrix.

The diffusion function 1318 selected may dictate a scan pattern to be applied by the scan pattern engine 1310 and the number of iterations of the diffusion function to be applied by the iteration manager 1312. However, a particular diffusion function may be flexible with respect to what scan pattern is used, in which case the scan pattern engine may select a scan pattern based on the original smoothness or other characteristics of the image residue received and/or on the processing power or other characteristics of the device hosting an exemplary compression engine 1300.

A reverse diffusion module 1320 may be included in the exemplary compression engine 1300 or may be used separately to reverse the applied diffusion smoothing using one or more anchor values for each subject matrix. In some implementations, each iteration of a reverse diffusion uses a different anchor value proper to the iteration.

A threshold manager 1322 may be included to monitor pixel values and/or smoothed pixel values in order to determine an amount of diffusion to be applied, for example, the threshold manager 1322 may signal the iteration manager 1312 to stop iterating when variances between smoothed pixel values are falling within a certain lowered range.

An exemplary compression engine 1300 can be hardware, software, or a combination of both hardware and software.

Exemplary Computing Device

FIG. 14 shows an exemplary computer 1400 suitable as one environment for practicing aspects of the subject matter. The components of exemplary computer 1400 may include, but are not limited to, a processing unit 1420, a system memory 1430, and a system bus 1421 that couples various system components including the system memory 1430 to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1400 typically includes a variety of computer-readable media. Computer-readable media can be any available media that can be accessed by exemplary computer 1400 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 1400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within exemplary computer 1400, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, an exemplary compression engine 1300, application programs 1435, other program modules 1436, and program data 1437. Although the exemplary compression engine 1300 is depicted as software in random access memory 1432, other implementations of an exemplary compression engine 1300 can be hardware or combinations of software and hardware.

The exemplary computer 1400 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface such as interface 1450.

The drives and their associated computer storage media discussed above and illustrated in FIG. 14 provide storage of computer-readable instructions, data structures, program modules, and other data for exemplary computer 1400. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. A user may enter commands and information into the exemplary computer 1400 through input devices such as a keyboard 1462 and pointing device 1461, commonly referred to as a mouse, trackball, or touch pad. Other input devices (not shown) may include a microphone, joystick, game pad, satellite dish, scanner, or the like. These and other input devices are often connected to the processing unit 1420 through a user input interface 1460 that is coupled to the system bus, but may be connected by other interface and bus structures, such as a parallel port, game port, or a universal serial bus (USB). A monitor 1491 or other type of display device is also connected to the system bus 1421 via an interface, such as a video interface 1490. In addition to the monitor 1491, computers may also include other peripheral output devices such as speakers 1497 and printer 1496, which may be connected through an output peripheral interface 1495.

The exemplary computer 1400 may operate in a networked environment using logical connections to one or more remote computers, such as a remote computer 1480. The remote computer 1480 may be a personal computer, a server, a router, a network PC, a peer device or other common network node, and typically includes many or all of the elements described above relative to exemplary computer 1400, although only a memory storage device 1481 has been illustrated in FIG. 14. The logical connections depicted in FIG. 14 include a local area network (LAN) 1471 and a wide area network (WAN) 1473, but may also include other networks. Such networking environments are commonplace in offices, enterprise-wide computer networks, intranets, and the Internet.

When used in a LAN networking environment, the exemplary computer 1400 is connected to the LAN 1471 through a network interface or adapter 1470. When used in a WAN networking environment, the exemplary computer 1400 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the exemplary computer 1400, or portions thereof, may be stored in the remote memory storage device. By way of example, and not limitation, FIG. 14 illustrates remote application programs 1485 as residing on memory device 1481. It will be appreciated that the network connections shown are exemplary and other means of establishing a communications link between the computers may be used.

CONCLUSION

The foregoing describes exemplary reversible diffusion-based compression methods and systems. The subject matter described above can be implemented in hardware, in software, or in both hardware and software. In certain implementations, the exemplary system and methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A noise reduction engine, comprising:
a buffer for storing pixel values;
a matrix selector for selecting dimensions of matrices for arranging the pixel values to represent regions of prediction error image residue;
a diffusion engine for applying a reversible diffusion function for reducing the magnitude of at least some of the pixel values and for reducing variability in the difference between adjacent pixel values in a subject matrix by diffusing magnitudes of pixel values into each other to thereby reduce noise associated with application of a frequency domain transform and application of an inverse frequency domain transform, wherein an anchor value facilitates reverse diffusion by the reversible diffusion function; and
an anchor value selector associated with the diffusion engine to select one of the pixel values in a given matrix as the anchor value, wherein the anchor value facilitates the reverse diffusion by the reversible diffusion function to restore the magnitude of the at least some of the pixel values after application of the frequency domain transform to the diffused pixel values and application of the inverse frequency domain transform to recover the diffused pixel values.

2. The noise reduction engine as recited in claim 1, further comprising an entropy calculator associated with the anchor value selector to select an anchor value based on an entropy value of one or more of the pixel values.

3. The noise reduction engine as recited in claim 1, further comprising a scan pattern engine to apply the reversible diffusion function to a matrix of pixel values in an order.

4. The noise reduction engine as recited in claim 3, further comprising an iteration manager to control an amount of diffusion to be applied to a matrix of pixel values by controlling a number of times that the reversible diffusion function is applied.

5. The noise reduction engine as recited in claim 1, further comprising a store of reversible diffusion functions suitable for different image residues.

6. The noise reduction engine as recited in claim 1, further comprising a reverse diffusion module to apply the reverse diffusion using the anchor value.

7. One or more computer storage media having computer-executable instructions stored thereon that, when executed, direct at least one computer to perform acts, the acts comprising:
storing pixel values in a buffer;
selecting, by a matrix selector, dimensions of matrices for arranging the pixel values to represent regions of prediction error image residue
applying, by a diffusion engine, a reversible diffusion function for reducing the magnitude of at least some of the pixel values and for reducing variability in the difference between adjacent pixel values in a subject matrix by diffusing magnitudes of pixel values into each other to thereby reduce noise associated with application of a frequency domain transform and application of an inverse frequency domain transform, wherein an anchor value facilitates reverse diffusion by the reversible diffusion function; and
selecting, by an anchor value selector associated with the diffusion engine, one of the pixel values in a given matrix as the anchor value, wherein the anchor value facilitates the reverse diffusion by the reversible diffusion function to restore the magnitude of the at least some of the pixel values after application of the frequency domain transform to the diffused pixel values and application of the inverse frequency domain transform to recover the diffused pixel values.

8. The one or more computer storage media as recited in claim 7, the acts further comprising selecting, by an entropy calculator associated with the anchor value selector, an anchor value based on an entropy value of one or more of the pixel values.

9. The one or more computer storage media as recited in claim 7, the acts further comprising applying, by a scan pattern engine, the reversible diffusion function to a matrix of pixel values in an order.

10. The one or more computer storage media as recited in claim 9, the acts further comprising controlling, by an iteration manager, an amount of diffusion to be applied to a matrix of pixel values by controlling a number of times that the reversible diffusion function is applied.

11. The one or more computer storage media as recited in claim 7, the acts further comprising maintaining a store of reversible diffusion functions suitable for different image residues.

12. The one or more computer storage media as recited in claim 7, the acts further comprising applying, by a reverse diffusion module, the reverse diffusion using the anchor value.

13. A system, comprising:
- at least one memory;
- at least one processor;
- a buffer for storing pixel values;
- instructions stored in the at least one memory and executed by the at least one processor, the instructions comprising:
- a matrix selector for selecting dimensions of matrices for arranging the pixel values to represent regions of prediction error image residue;
- a diffusion engine for applying a reversible diffusion function for reducing the magnitude of at least some of the pixel values and for reducing variability in the difference between adjacent pixel values in a subject matrix by diffusing magnitudes of pixel values into each other to thereby reduce noise associated with application of a frequency domain transform and application of an inverse frequency domain transform, wherein an anchor value facilitates reverse diffusion by the reversible diffusion function; and
- an anchor value selector associated with the diffusion engine to select one of the pixel values in a given matrix as the anchor value wherein the anchor value facilitates the reverse diffusion by the reversible diffusion function to restore the magnitude of the at least some of the pixel values after application of the frequency domain transform to the diffused pixel values and application of the inverse frequency domain transform to recover the diffused pixel values.

14. The system as recited in claim 13, the instructions further comprising an entropy calculator associated with the anchor value selector to select an anchor value based on an entropy value of one or more of the pixel values.

15. The system as recited in claim 13, the instructions further comprising a scan pattern engine to apply the reversible diffusion function to a matrix of pixel values in an order.

16. The system as recited in claim 15, the instructions further comprising an iteration manager to control an amount of diffusion to be applied to a matrix of pixel values by controlling a number of times that the reversible diffusion function is applied.

17. The system as recited in claim 13, the instructions further comprising a store of reversible diffusion functions suitable for different image residues.

18. The noise reduction engine as recited in claim 13, the instructions further comprising a reverse diffusion module to apply the reverse diffusion using the anchor value.

* * * * *